ST. GEORGE CRAIG.
PECAN NUTCRACKER.
APPLICATION FILED OCT. 25, 1920.
1,371,072.
Patented Mar. 8, 1921.
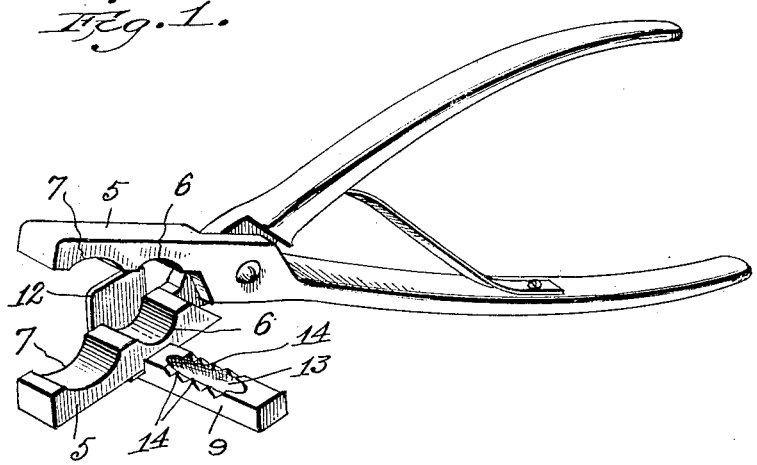
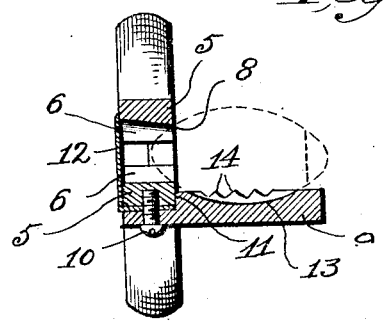

UNITED STATES PATENT OFFICE.

ST. GEORGE CRAIG, OF HENDERSON, KENTUCKY.

PECAN-NUTCRACKER.

1,371,072.  Specification of Letters Patent.  Patented Mar. 8, 1921.

Application filed October 25, 1920. Serial No. 419,263.

*To all whom it may concern:*

Be it known that I, ST. GEORGE CRAIG, a citizen of the United States of America, and a resident of Henderson, county of Henderson, and State of Kentucky, have invented certain new and useful Improvements in Pecan-Nutcrackers, of which the following is a full and clear specification.

The object of this invention is to provide a simple hand-tool for cracking pecan-nuts, the special object being to so construct the device that the two halves of the meat or kernel may readily be removed whole, thereby enhancing the market value of the meat.

In the drawing—

Figure 1 is a perspective view; and

Fig. 2 is a transverse sectional view of a tool embodying the preferred form of my device.

The implement shown in my drawing consists of two levers pivoted together in the manner of pliers or pincers and provided with two jaws 5, which are provided on their inner faces with two pairs of nut-receiving recesses, the pair nearest the fulcrum of the levers being designated 6 and the outer pair being designated 7. One of the recesses of the inner pair, preferably the upper recess, is inclined on one side to form a curved sharp cutting-edge 8, and alongside the lower one of these recesses—that is, on the lower jaw—is affixed an outwardly-extending nut-rest 9 consisting of a bar rigidly fastened to the under-side of the jaw by a screw 10 and provided with a shoulder 11 which abuts against the adjacent side of the jaw to thereby rigidly anchor the nut-rest to the lower jaw. This nut-rest is centrally in line with the nut-receiving recesses 6. At the other side of the lower jaw is fastened a shield 12 which is sufficiently wide to encompass the lower recess 6 and extends high enough to cover the adjacent end of the upper recess 6 when the jaws are brought together for the purpose of cutting the nut-shell.

In using my implement, the nut is placed on the shelf 9, as shown in dotted lines in Fig. 2, with its one end entering and resting on the lower curved edge of the recess 6, the end of the nut entering the recess the desired distance. The shelf 9 is recessed at 13 to better hold the nut on the shelf, and to still further assist the user in holding the nut on the shelf, the longitudinal edges of the recess 13 are serrated at 14 to provide upstanding pointed members to bite into the nut and hold it against displacement while the jaws operate upon it. When the nut is thus placed and the jaws are brought together, the cutting-edge 8. coöperating with the sharp corner of the lower jaw, will sever the end of the shell, and the severed part will be prevented from falling out of the jaw and thus littering up the floor by the shield 12. After one end of the nut is thus severed, the nut is reversed and the other end is severed in like manner. After the ends of the nut-shell are thus removed, the nut is placed in the other recesses 7 to thereby crack the shell sufficiently to remove the meat. After the ends are thus severed, the arch formation of the shell is destroyed and, consequently, the cracking of the body of the nut requires very little force and can be done with sufficient delicacy to readily prevent the halves of the kernel from being broken.

Another feature of importance lies in the fact that the jaw-recesses which require the application of a greater degree of force are arranged near to the fulcrum of the levers, whereas the final-crushing jaw-recesses, which require very little manual power, are located farther away from the fulcrum, and it will be further noted that by having the cutting-recesses and the crushing-recesses in the same implement and closely adjacent to each other, the nut may be moved from cutting position to crushing position readily— that is, by simply moving the nut from the cutting-recess to the crushing-recess—so that the operations of severing and crushing the nut-shell are completed with one handling of the nut.

The nature and scope of the invention having been thus indicated and its preferred embodiment having been specifically described, what is claimed as new is:

1. In a nut-cracking implement, a pair of levers having jaws provided with two pairs of coöperating transverse recesses, one pair of recesses being provided with a cutting-edge adapted to cut off the ends of the nut and the other being adapted to crush the body of the nut, a laterally-projecting nut-rest being provided below and adjacent the lower half of the cutting-recess.

2. In a nut-cracking implement, a pair of levers having jaws provided with two pairs of coöperating recesses, one pair of recesses being provided with a cutting-edge adapted to cut off the ends of the nut and the other being adapted to crush the body of the nut, a shield being provided on the off-side of the cutting-recess to close the cutting-recesses during the act of cutting, to thereby prevent the severed end of the shell from prematurely falling out of the recess.

3. In a nut-cracking implement, a pair of levers having jaws provided with two pairs of coöperating recesses, one pair of recesses being provided with a cutting-edge adapted to cut off the ends of the nut and the other being adapted to crush the body of the nut, the lower jaw being provided on one side with a nut-rest and on the other side with a shield, for the purposes set forth.

4. In a nut-cracking implement, a pair of levers having jaws provided with two pairs of coöperating transverse recesses, one pair of recesses being provided with a cutting-edge adapted to cut off the ends of the nut and the other being adapted to crush the body of the nut, the cutting-recesses being located at a point between the crushing-recesses and the fulcrum of the levers.

5. In a nut-cracking implement, a pair of levers having jaws provided with two pairs of coöperating recesses, one pair of recesses being provided with a cutting-edge adapted to cut off the ends of the nut and the other being adapted to crush the body of the nut, a laterally projecting nut-rest being provided adjacent the lower half of the cutting-recess, said nut-rest being provided with a nut-receiving recess in its upper face.

In testimony whereof I hereunto affix my signature.

ST. GEO. CRAIG.